US011460582B2

(12) United States Patent
Asako

(10) Patent No.: US 11,460,582 B2
(45) Date of Patent: Oct. 4, 2022

(54) VEHICLE EXTERIOR ENVIRONMENT MONOSCOPIC AND STEREOSCOPIC BASED DETECTION APPARATUS

(71) Applicant: SUBARU CORPORATION, Tokyo (JP)

(72) Inventor: Junichi Asako, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 359 days.

(21) Appl. No.: 16/732,977

(22) Filed: Jan. 2, 2020

(65) Prior Publication Data

US 2020/0301018 A1 Sep. 24, 2020

(30) Foreign Application Priority Data

Mar. 19, 2019 (JP) .............................. JP2019-050980

(51) Int. Cl.
*G01S 17/931* (2020.01)
*G01S 17/86* (2020.01)
(Continued)

(52) U.S. Cl.
CPC ............ *G01S 17/931* (2020.01); *G01S 17/86* (2020.01); *G06T 1/20* (2013.01); *G06T 5/50* (2013.01); *G01S 7/4913* (2013.01)

(58) Field of Classification Search
None
See application file for complete search history.

(56) References Cited

U.S. PATENT DOCUMENTS

2008/0136612 A1 6/2008 Machii et al.
2009/0033745 A1* 2/2009 Yeredor ........... G08B 13/19608
348/152

(Continued)

FOREIGN PATENT DOCUMENTS

JP 2003061075 A * 2/2003
JP 2008-123462 A 5/2008
JP 4961234 B2 * 6/2012

OTHER PUBLICATIONS

Anthony et al, 'Vision Based Vehicle Detection: A Literature Review', Intl. J. of Applied Engineering Research, 11(5), pp. 3128-3133. (Year: 2016).*

(Continued)

*Primary Examiner* — Patrick F Valdez
(74) *Attorney, Agent, or Firm* — McDermott Will & Emery LLP

(57) ABSTRACT

A vehicle exterior environment detection apparatus includes a distance image generator, a vehicle detector, a search processor, a vehicle width calculator, and a predictor. The distance image generator generates a plurality of distance images including a first distance image, a second distance image, and a third distance image, on a basis of a plurality of stereo images including a first stereo image, a second stereo image, and a third stereo image each including a left image and a right image. The predictor predicts a position of a target vehicle in the left image and the right image included in the third stereo image, on a basis of a first vehicle image width calculated on a basis of the first distance image and a second vehicle image width calculated on a basis of a selected image of the second stereo image.

19 Claims, 7 Drawing Sheets

(51) Int. Cl.
*G06T 1/20* (2006.01)
*G06T 5/50* (2006.01)
*G01S 7/4913* (2020.01)

(56) References Cited

U.S. PATENT DOCUMENTS

2015/0085119 A1* 3/2015 Dagan .................. G06T 7/20
348/148
2018/0321030 A1* 11/2018 Kido .................. G06T 7/74

OTHER PUBLICATIONS

Kim et al, 'Vision-based Vehicle Detection and Inter-Vehicle Distance Estimation', 12th International Conference on Control, Automation and Systems, pp. 625-629. (Year: 2012).*

* cited by examiner

VEHICLE EXTERIOR ENVIRONMENT MONOSCOPIC AND STEREOSCOPIC BASED DETECTION APPARATUS

CROSS-REFERENCE TO RELATED APPLICATIONS

The present application claims priority from Japanese Patent Application No. 2019-050980 filed on Mar. 19, 2019, the entire contents of which are hereby incorporated by reference.

BACKGROUND

The technology relates to a vehicle exterior environment detection apparatus that detects a vehicle around an own vehicle.

There are some vehicles such as automobiles each of which detects a vehicle around an own vehicle and controls, for example, traveling of the own vehicle depending on a result obtained by the detection. For example, Japanese Unexamined Patent Application Publication No. 2008-123462 discloses a technique that detects a vehicle around an own vehicle using a stereo camera, and calculates, on the basis of a width of the relevant vehicle, a relative speed between a traveling speed of the own vehicle and a traveling speed of the relevant vehicle.

SUMMARY

An aspect of the technology provides a vehicle exterior environment detection apparatus including a distance image generator, a vehicle detector, a search processor, a vehicle width calculator, and a predictor. The distance image generator is configured to generate a plurality of distance images on the basis of a plurality of stereo images. The plurality of distance images includes a first distance image, a second distance image, and a third distance image. The plurality of stereo images includes a first stereo image, a second stereo image, and a third stereo image. The first stereo image, the second stereo image, and the third stereo image are captured at timings different from each other and each include a left image and a right image. The vehicle detector is configured to perform a detection of a target vehicle on the basis of each of the plurality of distance images. The search processor is configured to perform searching of the target vehicle on the basis of the left image and the right image included in each of the plurality of stereo images, and select, as a selected image, one of the left image and the right image on the basis of a result of the searching. The vehicle width calculator is configured to calculate, as a first vehicle image width, an image width of the target vehicle in each of the plurality of distance images, and calculate, as a second vehicle image width, an image width of the target vehicle in the selected image of each of the plurality of stereo images. The predictor is configured to predict a position of the target vehicle in the left image and the right image included in the third stereo image, on the basis of the first vehicle image width calculated on the basis of the first distance image and the second vehicle image width calculated on the basis of the selected image of the second stereo image.

An aspect of the technology provides a vehicle exterior environment detection apparatus including circuitry. The circuitry is configured to: generate a plurality of distance images on the basis of a plurality of stereo images, the plurality of distance images including a first distance image, a second distance image, and a third distance image, the plurality of stereo images including a first stereo image, a second stereo image, and a third stereo image, the first stereo image, the second stereo image, and the third stereo image being captured at timings different from each other and each including a left image and a right image; perform a detection of a target vehicle on the basis of each of the plurality of distance images; perform searching of the target vehicle on the basis of the left image and the right image included in each of the plurality of stereo images, and select, as a selected image, one of the left image and the right image on the basis of a result of the searching; calculate, as a first vehicle image width, an image width of the target vehicle in each of the plurality of distance images, and calculate, as a second vehicle image width, an image width of the target vehicle in the selected image of each of the plurality of stereo images; and predict a position of the target vehicle in the left image and the right image included in the third stereo image, on the basis of the first vehicle image width calculated on the basis of the first distance image and the second vehicle image width calculated on the basis of the selected image of the second stereo image.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
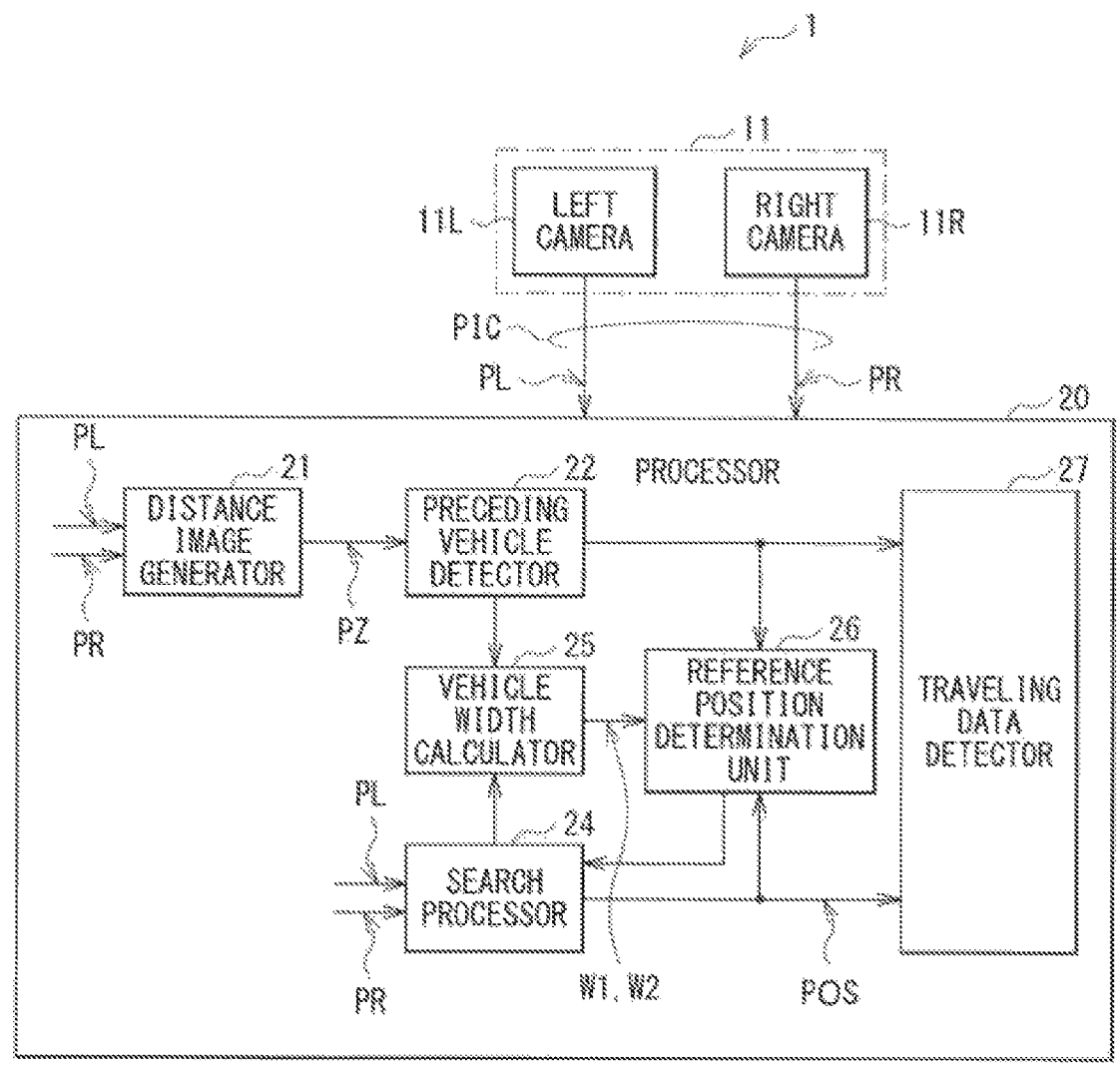
FIG. 1 is a block diagram illustrating a configuration example of a vehicle exterior environment detection apparatus according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In a process of detecting a vehicle around an own vehicle, it is desired that detection accuracy be high, and a further improvement in the detection accuracy is expected.

It is desirable to provide a vehicle exterior environment detection apparatus that is able to enhance accuracy of detecting a vehicle.

Example Embodiment

Configuration Example

FIG. 1 illustrates a configuration example of a vehicle exterior environment detection apparatus 1 according to an example embodiment. In one embodiment, the vehicle exterior environment detection apparatus 1 may serve as a "vehicle exterior environment detection apparatus". The vehicle exterior environment detection apparatus 1 may include a stereo camera 11 and a processor 20. The vehicle exterior environment detection apparatus 1 may be mounted on a vehicle 10 such as an automobile.

The stereo camera 11 may capture an image ahead of the vehicle 10 to thereby generate a pair of images (a left image PL and a right image PR) each having a parallax with respect to each other. The stereo camera 11 may have a left camera 11L and a right camera 11R. In this example, the left camera 11L and a right camera 11R may be disposed in the vicinity of a rearview mirror of the vehicle 10 and separated away from each other by a predetermined distance in a width direction of the vehicle 10. The left camera 11L and the right camera 11R may perform an imaging operation synchronously. The left camera 11L may generate the left image PL, and the right camera 11R may generate the right image PR. The left image PL and the right image PR may form a stereo image PIC. The stereo camera 11 may perform the imaging operation at a predetermined frame rate (for example, 60 [fps]) to thereby generate a series of stereo images PIC.

Figure 2A:
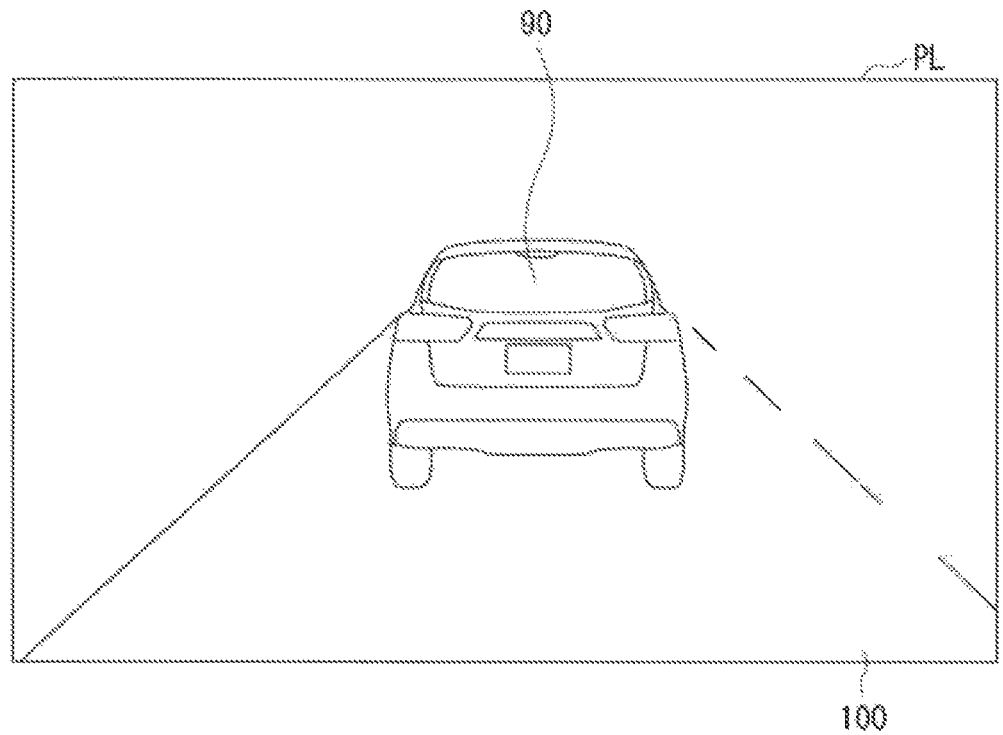
FIG. 2A is an image diagram illustrating an example of a left image generated by a left camera illustrated in FIG. 1.
Figure 2B:
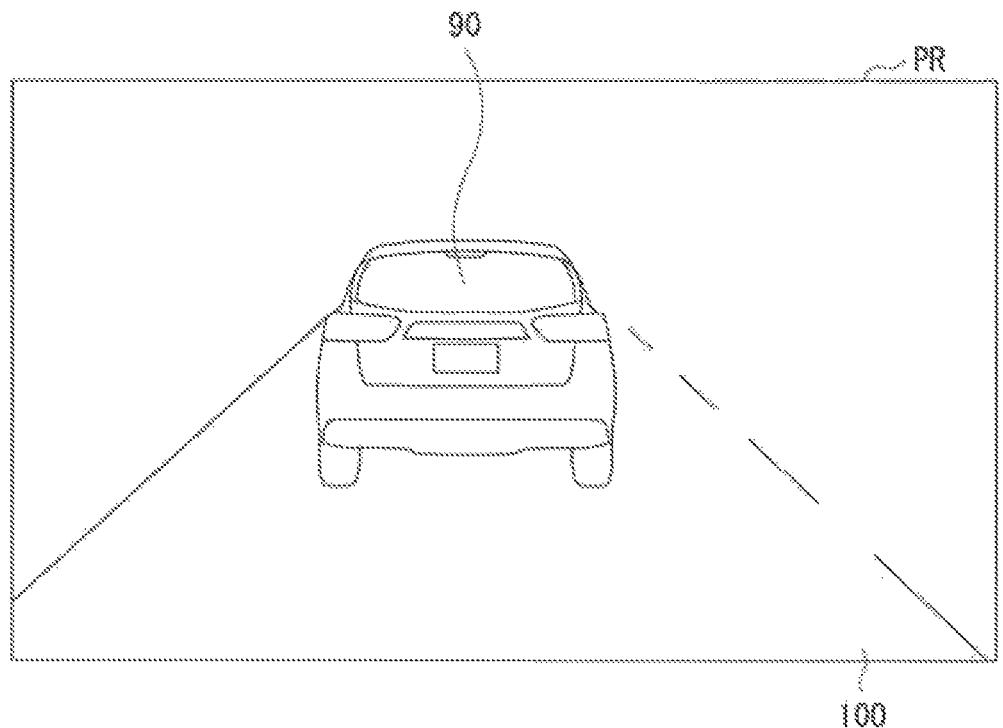
FIG. 2B is an image diagram illustrating an example of a right image generated by a right camera illustrated in FIG. 1.

FIG. 2A illustrates an example of the left image PL, and FIG. 2B illustrates an example of the right image PR. In this example, another vehicle, i.e., a preceding vehicle 90, is traveling ahead of the vehicle 10 on a road on which the vehicle 10 is traveling. The left camera 11L may capture an image of the preceding vehicle 90 to thereby generate the left image PL, and the right camera 11R may capture an image of the preceding vehicle 90 to thereby generate the right image PR. As a result, the left image PL and the right image PR may each have a parallax with respect to each other. The stereo camera 11 may generate the stereo image PIC including the left image PL and the right image PR.

The processor 20 (illustrated in FIG. 1) may detect traveling data of the preceding vehicle 90 on the basis of the stereo image PIC supplied by the stereo camera 11. The traveling data of the preceding vehicle 90 may include, for example, a relative distance from the vehicle 10 to the preceding vehicle 90, and a relative speed between a traveling speed of the vehicle 10 and a traveling speed of the preceding vehicle 90. The vehicle 10 may perform, for example, traveling controls such as an adaptive cruise control or a steering-assisting control on the basis of the traveling data of the preceding vehicle 90 obtained by the processor 20. The processor 20 may include, for example, a central processing unit (CPU) that executes programs, a random access memory (RAM) that temporarily stores processing data, and a read only memory (ROM) that stores programs. The processor 20 may include a distance image generator 21, a preceding vehicle detector 22, a search processor 24, a vehicle width calculator 25, a reference position determination unit 26, and a traveling data detector 27.

The distance image generator 21 may perform a predetermined image process including a stereo matching process and a filtering process on the basis of the left image PL and the right image PR included in the stereo image PIC, to thereby generate a distance image PZ. A pixel value of each pixel in the distance image PZ may be a depth value in a three-dimensional real space, which indicates a distance to a point corresponding to the relevant pixel. The distance image generator 21 may supply the preceding vehicle detector 22 with the generated distance image PZ.

The preceding vehicle detector 22 may detect the preceding vehicle 90 on the basis of the distance image PZ. In the distance image PZ, depth values in an image region corresponding to the preceding vehicle 90 may be smaller than depth values in an image region other than the image region corresponding to the preceding vehicle 90. The preceding vehicle detector 22 may detect the preceding vehicle 90 on the basis of such depth values included in the distance image PZ.

Figure 3:
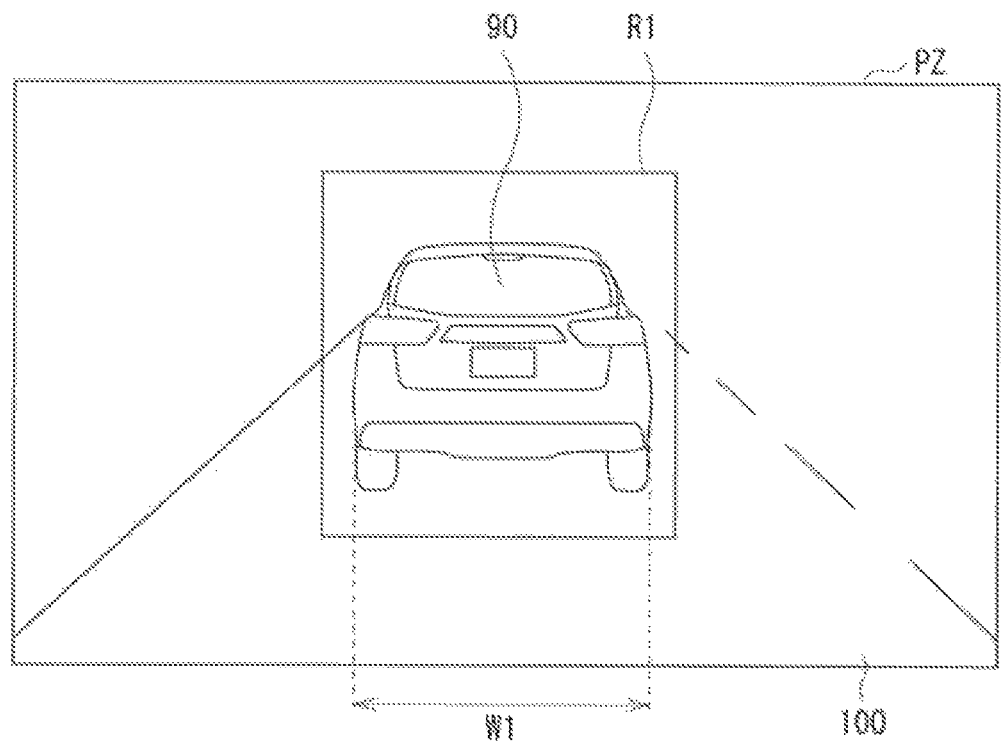
FIG. 3 is an image diagram schematically illustrating an operation example of a preceding vehicle detector illustrated in FIG. 1.

FIG. 3 schematically illustrates an example of a detection result obtained by the preceding vehicle detector 22. The preceding vehicle detector 22 may detect the preceding vehicle 90 on the basis of the distance image PZ. Further, the preceding vehicle detector 22 may identify a position of the preceding vehicle 90 in the distance image PZ as indicated by a region R1.

The search processor 24 may search for the preceding vehicle 90 on the basis of the left image PL and the right image PR using a machine learning technique.

Figure 4:
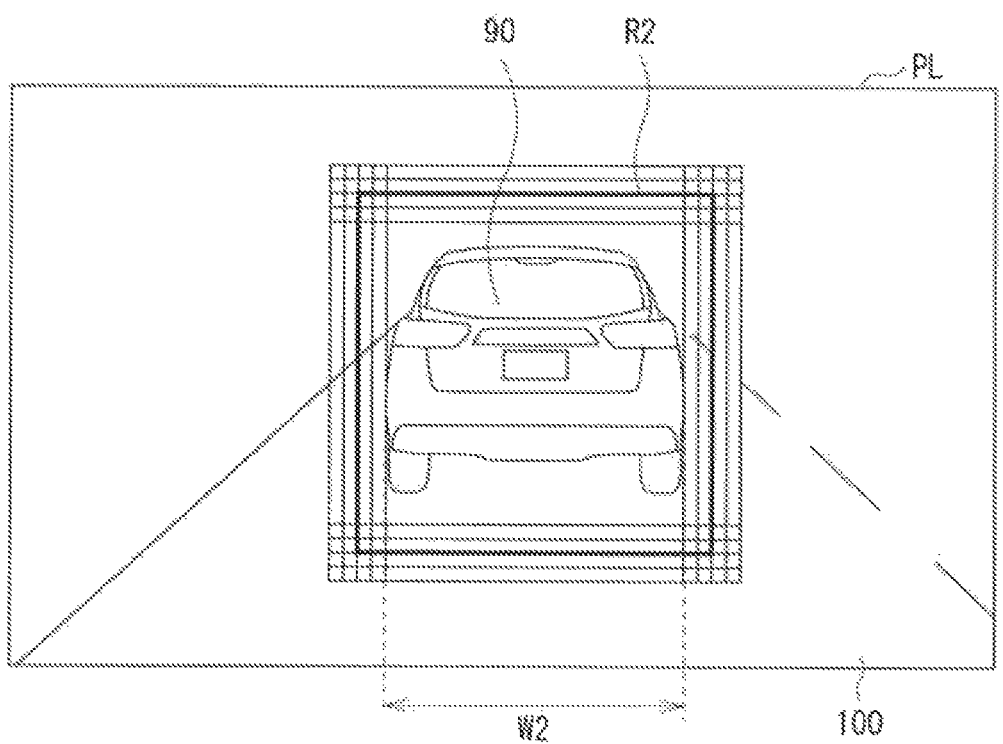
FIG. 4 is an image diagram schematically illustrating an operation example of a search processor illustrated in FIG. 1.

FIG. 4 schematically illustrates an example of a process performed by the search processor 24. In FIG. 4, the search processor 24 searches for the preceding vehicle 90 on the basis of the left image PL. The search processor 24 may be supplied, by the reference position determination unit 26, with data related to a search reference position POS to be used for performing a search process. The search reference position POS may be a predicted position at which the preceding vehicle 90 is predicted to be detected in the left image PL and in the right image PR. The search processor 24 may search for the preceding vehicle 90 by sequentially setting process target regions R2 having a predetermined size while slightly changing the positions of the process target regions R2 each time, on the basis of the search reference position POS as a reference. The search processor 24 may confirm whether the preceding vehicle 90 exists in each process target region R2 using a machine learning technique. In this way, the search processor 24 may identify the position of the preceding vehicle 90 in the left image PL and the right image PR.

The search processor 24 may evaluate, by using a machine learning technique, a certainty that the preceding vehicle 90 is a vehicle on the basis of a result obtained by searching for the preceding vehicle 90, to thereby select, as an image P, either one of the left image PL and the right image PR. In one example, the search processor 24 may evaluate, by using a machine learning technique, the certainty that the preceding vehicle 90 is a vehicle on the basis of an image corresponding to the identified preceding vehicle 90 in the left image PL and an image corresponding to the identified preceding vehicle 90 in the right image PR, to thereby generate respective scores of the left image PL and the right image PR. The search processor 24 may select, as the image P, an image whose score is higher out of the left image PL and the right image PR. The search processor 24 may supply the traveling data detector 27 with a search result on the image P.

The vehicle width calculator 25 (illustrated in FIG. 1) may calculate an image width, i.e., a vehicle image width W1 illustrated in FIG. 3, of the preceding vehicle 90 in the distance image PZ on the basis of the detection result obtained by the preceding vehicle detector 22. The vehicle width calculator 25 may also calculate an image width, i.e., a vehicle image width W2 illustrated in FIG. 4, of the preceding vehicle 90 in the image P selected by the search processor 24 on the basis of the search result obtained by the search processor 24.

The reference position determination unit 26 may determine the search reference position POS to be used in s search process on a subsequent frame F on the basis of the detection result obtained by the preceding vehicle detector 22, the search result obtained by the search processor 24, and the vehicle image widths W1 and W2.

The traveling data detector 27 may obtain the traveling data of the preceding vehicle 90 on the basis of the detection result obtained by the preceding vehicle detector 22 and the search result obtained by the search processor 24.

In one example, in a case where image accuracy of the distance image PZ is high, the traveling data detector 27 may obtain the traveling data of the preceding vehicle 90 on the basis of the detection result obtained by the preceding vehicle detector 22. At that time, the traveling data detector 27 may obtain the traveling data of the preceding vehicle 90 on the basis of the depth values in the image region corresponding to the preceding vehicle 90 included in the distance image PZ.

In one example, in a case where image accuracy of the distance image PZ is low, the traveling data detector 27 may obtain the traveling data of the preceding vehicle 90 on the basis of the search result obtained by the search processor 24. That is, in a case where either one of the left image PL and the right image PR becomes unclear due to raindrops, for example, the image accuracy of the distance image PZ can decrease; therefore, in a case where the image accuracy of the distance image PZ is low, the traveling data detector 27 may obtain the traveling data of the preceding vehicle 90 on the basis of the search result based on the image P obtained by the search processor 24. In this case, the traveling data detector 27 may calculate an image width of the preceding vehicle 90 in the image P, and, on the basis of a size of the image width, may calculate a relative speed V between a traveling speed of the vehicle 10 and a traveling speed of the preceding vehicle 90 and a relative distance Z to the preceding vehicle 90, to thereby obtain the traveling data of the preceding vehicle 90. That is, for example, in a case where a distance between the vehicle 10 and the preceding vehicle 90 is small, the image width of the preceding vehicle 90 in the image P is large, and in a case where the distance between the vehicle 10 and the preceding vehicle 90 is large, the image width of the preceding vehicle 90 in the image P is small. Therefore, the traveling data detector 27 is able to obtain the traveling data of the preceding vehicle 90 on the basis of such an image size (scaling) of the preceding vehicle 90 in the image P.

With such a configuration, in the vehicle exterior environment detection apparatus 1, the preceding vehicle detector 22 may continuously detect the preceding vehicle 90 on the basis of a series of distance images PZ generated on the basis of the series of stereo images PIC, and the search processor 24 may also continuously searches for the preceding vehicle 90 on the basis of a series of left images PL and a series of right images PR. The search processor 24 may search for the preceding vehicle 90 on the basis of the search reference position POS determined by the reference position determination unit 26 in a frame F that immediately precedes a current frame F. Thereafter, the traveling data detector 27 may obtain the traveling data of the preceding vehicle 90 on the basis of the detection result obtained by the preceding vehicle detector 22 and the search result obtained by the search processor 24. At that time, as will be described below, in a case where a part of either one of the left image PL and the right image PR becomes unclear due to raindrops, etc., and the image accuracy of the distance image PZ decreases, for example, the vehicle exterior environment detection apparatus 1 may obtain the traveling data of the preceding vehicle 90 on the basis of an image, i.e., the image P, which is either one of the left image PL and the right image PR that has a higher certainty that the preceding vehicle 90 is a vehicle. In this way, the vehicle exterior environment detection apparatus 1 is able to enhance accuracy of detecting the preceding vehicle 90.

In one embodiment, the preceding vehicle detector 22 may serve as a "vehicle detector". In one embodiment, the preceding vehicle 90 may serve as a "target vehicle". In one embodiment, the vehicle image width W1 may serve as a "first vehicle image width". In one embodiment, the vehicle image width W2 may serve as a "second vehicle image width". In one embodiment, the reference position determination unit 26 may serve as a "predictor".

Operations and Workings

Now, description will be given on operations and workings of the vehicle exterior environment detection apparatus 1 of the example embodiment.

Outline of Overall Operations

First, with reference to FIG. 1, an outline of overall operations of the vehicle exterior environment detection apparatus 1 will be described. The stereo camera 11 may capture an image ahead of the vehicle 10 to thereby generate the stereo image PIC including the left image PL and the right image PR each having a parallax with respect to each other. The distance image generator 21 may generate the distance image PZ on the basis of the left image PL and the right image PR included in the stereo image PIC. The preceding vehicle detector 22 may detect the preceding vehicle 90 on the basis of the distance image PZ. The search processor 24 may search for the preceding vehicle 90 on the basis of the left image PL and the right image PR on the basis of the search reference position POS as a reference, by using a machine learning technique. Thereafter, the search processor 24 may evaluate, by using a machine learning technique, the certainty that the preceding vehicle 90 is a vehicle on the basis of a result obtained by searching for the preceding vehicle 90, to thereby select, as the image P, either one of the left image PL and the right image PR. The vehicle width calculator 25 may calculate the image width, i.e., the vehicle image width W1, of the preceding vehicle 90 in the distance image PZ on the basis of the detection result obtained by the preceding vehicle detector 22, and may also calculate the image width, i.e., the vehicle image width W2, of the preceding vehicle 90 in the image P selected by the search processor 24 on the basis of the search result obtained by the search processor 24. The reference position determination unit 26 may determine the search reference position POS to be used in the search process on the subsequent frame F on the basis of the detection result obtained by the preceding vehicle detector 22, the search result obtained by the search processor 24, and the vehicle image widths W1 and W2. The traveling data detector 27 may obtain the traveling data of the preceding vehicle 90 on the basis of the detection result obtained by the preceding vehicle detector 22 and the search result obtained by the search processor 24.

Detailed Operations

Figure 5:
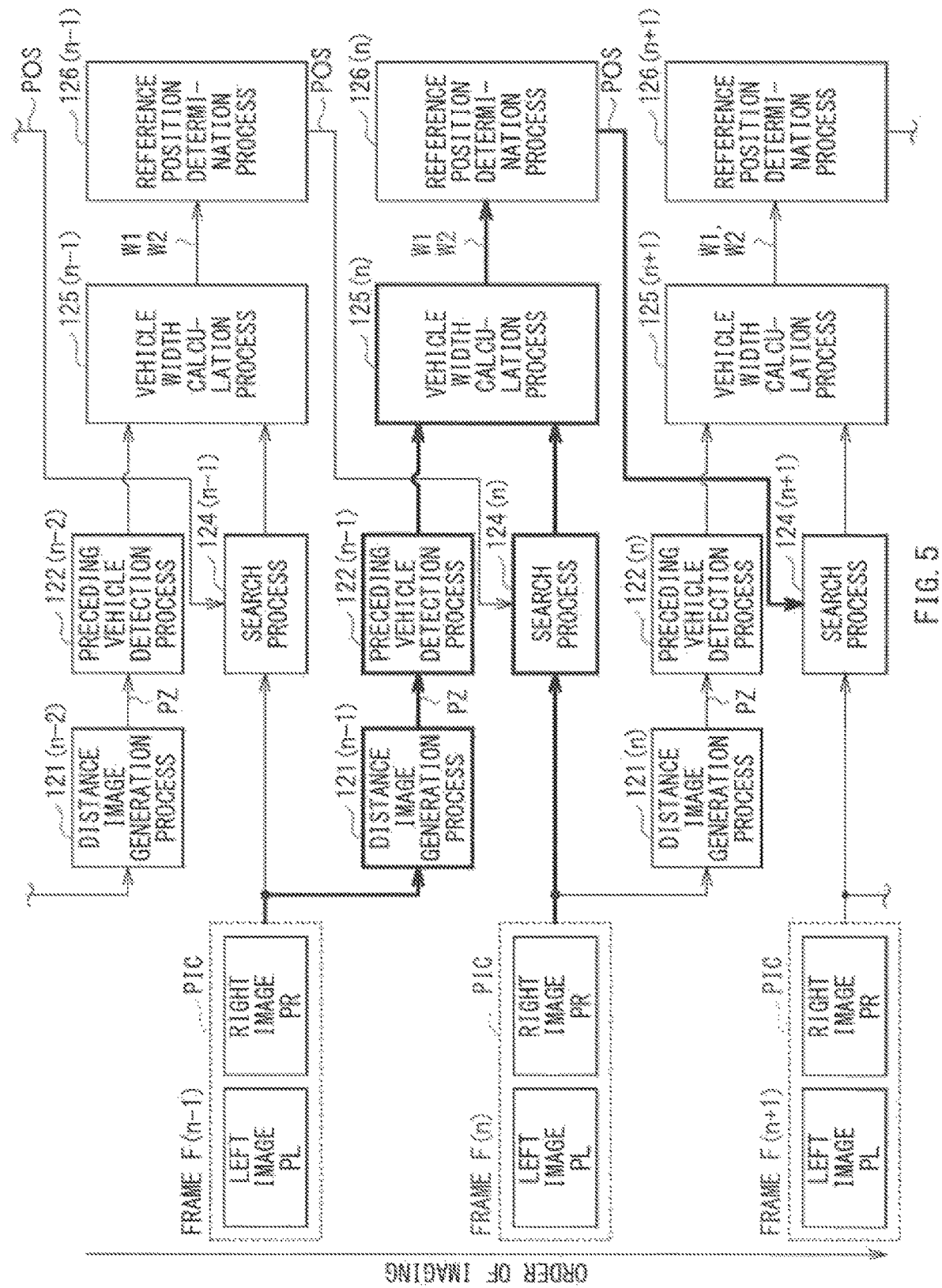
FIG. 5 is an explanatory diagram illustrating an operation example of a processor illustrated in FIG. 1.

FIG. 5 illustrates an operation example of the vehicle exterior environment detection apparatus 1. The distance image generator 21 may perform a distance image generation process 121, the preceding vehicle detector 22 may perform a preceding vehicle detection process 122, and the search processor 24 may perform a search process 124. Further, the vehicle width calculator 25 may perform a vehicle width calculation process 125, and the reference position determination unit 26 may perform a reference position determination process 126.

The stereo camera 11 may perform an imaging operation at a predetermined frame rate, for example, 60 [fps], to thereby generate a series of stereo images PIC. FIG. 5 illustrates a stereo image PIC corresponding to a frame F(n−1), a stereo image PIC corresponding to a frame F(n) that is subsequent to the frame F(n−1), and a stereo image PIC corresponding to a frame F(n+1) that is subsequent to the frame F(n). Hereinafter, focusing on the process denoted in thick lines, the operation will be described.

For example, the distance image generator 21 may perform a distance image generation process 121(n−1) on the basis of the stereo image PIC corresponding to the frame F(n−1) that immediately precedes the frame F(n), to thereby generate the distance image PZ. The preceding vehicle detector 22 may perform preceding a vehicle detection process 122(n−1) on the basis of the distance image PZ, to thereby detect the preceding vehicle 90.

The search processor 24 may perform a search process 124(n) on the basis of the left image PL and the right image PR included in the stereo image PIC corresponding to the frame F(n) using the search reference position POS as a reference, to thereby search for the preceding vehicle 90. The search reference position POS may be generated in a reference position determination process 126(n−1) on the frame F(n−1) that immediately precedes the frame F(n). In this way, the search processor 24 may identify the position of the preceding vehicle 90 in the left image PL and the right image PR. Thereafter, the search processor 24 may evaluate the certainty that the preceding vehicle 90 is a vehicle on the basis of the image corresponding to the identified preceding vehicle 90 in the left image PL and the image corresponding to the identified preceding vehicle 90 in the right image PR, to thereby select one of the left image PL and the right image PR as the image P.

The vehicle width calculator 25 may perform a vehicle width calculation process 125(n), to thereby calculate the vehicle image widths W1 and W2. In one example, the vehicle width calculator 25 may calculate the vehicle image width W1 of the preceding vehicle 90 in the distance image PZ on the basis of the result of the preceding vehicle detection process 122(n−1) performed by the preceding vehicle detector 22, and may also calculate the vehicle image width W2 of the preceding vehicle 90 in the image P selected by the search processor 24 on the basis of the result of the search process 124(n) performed by the search processor 24. The reference position determination unit 26 may perform a reference position determination process 126(n) on the basis of the vehicle image widths W1 and W2, to thereby determine the search reference position POS. The search reference position POS may be used in a search process 124(n+1) on the frame F(n+1) that is subsequent to the frame F(n).

Although not illustrated, the traveling data detector 27 may obtain the traveling data of the preceding vehicle 90 on the basis of the result of the preceding vehicle detection process 122(n) and the result of the search process 124(n).

The vehicle exterior environment detection apparatus 1 may continuously perform such operations, to thereby continuously obtain the traveling data of the preceding vehicle 90.

Further, the reference position determination process 126 performed by the reference position determination unit 26 will be described in detail.

Figure 6:
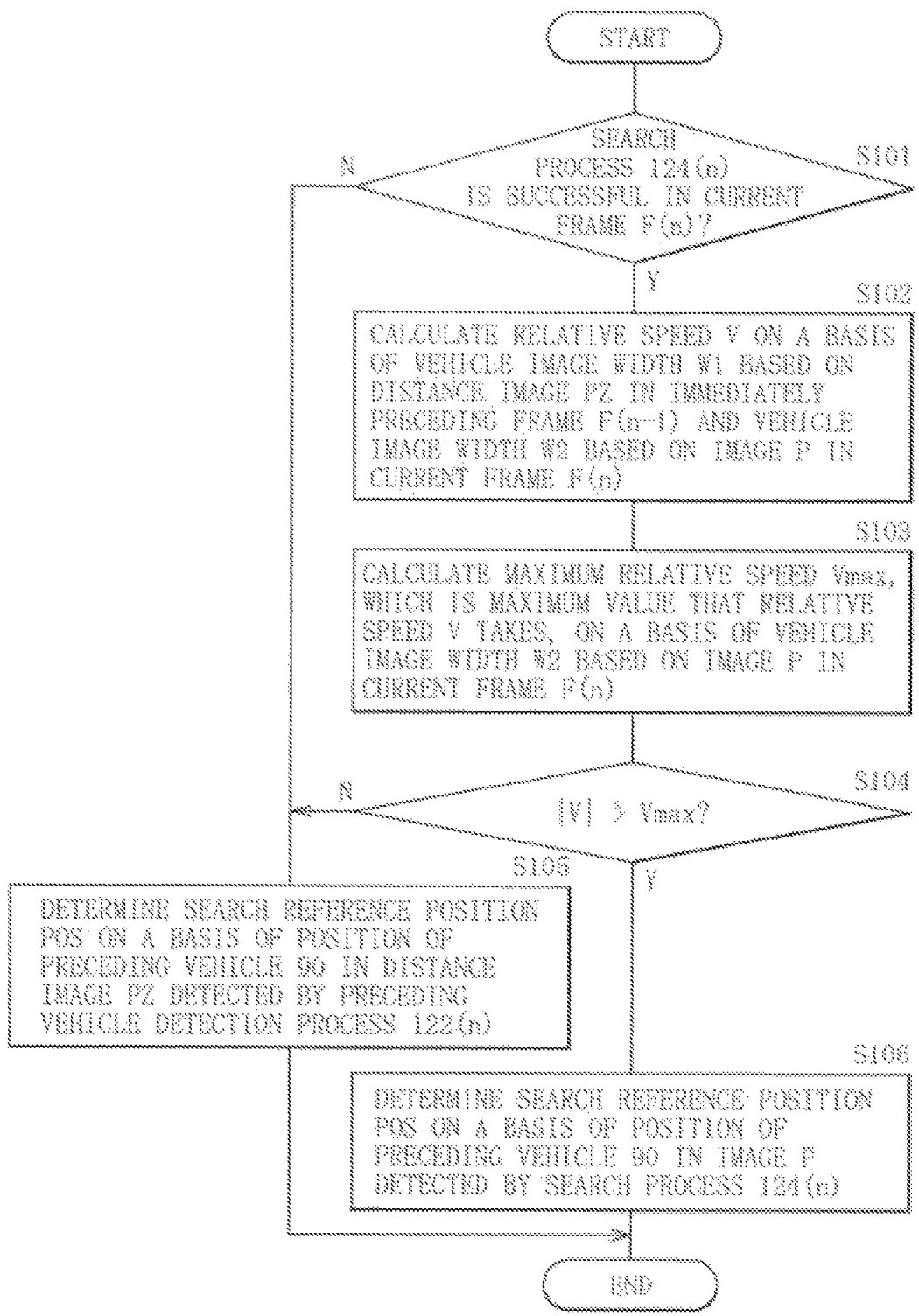
FIG. 6 is a flowchart illustrating an example of a reference position determination process illustrated in FIG. 5.

FIG. 6 illustrates an example of the reference position determination process 126(n) on the current frame F(n) illustrated in FIG. 5.

First, the reference position determination unit 26 may confirm whether the search process 124(n) is successful in the current frame F(n) (step S101). In one example, the reference position determination unit 26 may confirm whether the search process in the image P, which is selected from the left image PL and the right image PR in the search process 124(n), is successful. The search processor 24 may search for the preceding vehicle 90 by, as illustrated in FIG. 4, sequentially setting process target regions R2 while slightly changing the positions of the process target regions R2 each time, on the basis of the search reference position POS as a reference. It is desirable that the search process be finished within a time period corresponding to, for example, 1 (one) frame. The time period may be, in a case where the frame rate is 60 [fps], for example, 16.7 [msec] (=1/60); therefore, it may be difficult for the search processor 24 to search for the preceding vehicle 90 over a large area. Accordingly, for example, in a case where the search reference position POS in the image P largely deviates from the position of the preceding vehicle 90, or in a case where the image P is unclear, the search process can be unsuccessful. In a case where the search process 124(n) is not successful ("N" in step S101), the process proceeds to step S105.

In step S101, in a case where the search process 124(n) is successful ("Y" in step S101), the reference position determination unit 26 may calculate the relative speed V between the traveling speed of the vehicle 10 and the traveling speed of the preceding vehicle 90 on the basis of: the vehicle image width W1 based on the distance image PZ in the immediately preceding frame F(n−1) calculated in the vehicle width calculation process 125(n); and the vehicle image width W2 based on the image P selected by the search processor 24 in the current frame F(n) also calculated in the vehicle width calculation process 125(n) (step S102). In one example, using the image size (scaling) of the preceding vehicle 90, for example, the reference position determination unit 26 may calculate a relative distance D1 in the frame F(n−1) on the basis of the vehicle image width W1 and may also calculate a relative distance D2 in the frame F(n) on the basis of the vehicle image width W2. The difference between the respective timings at which the two frames F(n−1) and F(n) are imaged is, in a case where the frame rate is 60 [fps], for example, 16.7 [msec] (=1/60). Accordingly, the reference position determination unit 26 is able to calculate the relative speed V on the basis of the difference between the relative distances D1 and D2 and the frame rate.

Thereafter, the reference position determination unit 26 may calculate a maximum relative speed Vmax, which is a maximum value that relative speed V takes, on the basis of the vehicle image width W2 based on the image P in the current frame F(n) (step S103). The reference position determination unit 26 may calculate the maximum relative speed Vmax on the basis of the vehicle image width W2, by using a formula or a look-up table indicating a relationship between the vehicle image width W2 and the maximum relative speed Vmax, which is prepared in advance.

Thereafter, the reference position determination unit 26 may confirm whether an absolute value of the relative speed V exceeds the maximum relative speed Vmax (|V|>Vmax) (step S104). The reference position determination unit 26 may confirm whether accuracy of a process based on the distance image PZ is low by confirming whether the absolute value of the relative speed V exceeds the maximum relative speed Vmax. That is, for example, in a case where a part of either one of the left image PL and the right image PR becomes unclear due to raindrops, etc., the image accuracy of the distance image PZ can be decreased, and the accuracy of the process based on the distance image PZ can be decreased. In this case, the vehicle image width W1 calculated on the basis of the distance image PZ can deviate largely from a desired value. Even in such a case, however, it is unlikely that the vehicle image width W2 calculated on the basis of the image P is largely deviated from the desired value. One reason is that, the search processor 24 may select, as the image P, an image having a higher certainty that the preceding vehicle 90 is a vehicle from the left image PL and the right image PR, and the vehicle width calculator 25 may calculate the vehicle image width W2 on the basis of the image P. Therefore, the reference position determination unit 26 is able to confirm whether the accuracy of the process based on the distance image PZ is low by evaluating the relative speed V calculated on the basis of the vehicle image widths W1 and W2. In one example, in a case where the absolute value of the relative speed V exceeds the maximum relative speed Vmax, the reference position determination unit 26 may determine that the accuracy of the process based on the distance image PZ is low. In contrast, in a case where the absolute value of the relative speed V does not exceed the maximum relative speed Vmax, the reference position determination unit 26 may determine that the accuracy of the process based on the distance image PZ is high.

In step S101, in a case where the search process 124(n) is unsuccessful ("N" in step S101), or, in step S104, in a case where the absolute value of the relative speed V does not exceed the maximum relative speed Vmax ("N" in step S104), the reference position determination unit 26 may determine the search reference position POS on the basis of the position of the preceding vehicle 90 in the distance image PZ detected in the preceding vehicle detection process 122(n) (step S105).

That is, in the case where the search process 124(n) is unsuccessful ("N" in step S101), the preceding vehicle 90 is not detected in the search process 124(n), and it is difficult for the reference position determination unit 26 to determine the search reference position POS to be used for the search process 124(n+1) on the subsequent frame F(n+1). Therefore, the reference position determination unit 26 may determine the search reference position POS on the basis of the position of the preceding vehicle 90 in the distance image PZ detected in the preceding vehicle detection process 122(n). In contrast, in the case where the absolute value of the relative speed V does not exceed the maximum relative speed Vmax ("N" in step S104), the accuracy of the process based on the distance image PZ is high; therefore, the reference position determination unit 26 may determine the search reference position POS on the basis of the position of the preceding vehicle 90 in the distance image PZ.

Further, in step S104, in a case where the absolute value of the relative speed V exceeds the maximum relative speed Vmax ("Y" in step S104), the reference position determination unit 26 may determine the search reference position POS on the basis of the position of the preceding vehicle 90 in the image P detected in the search process 124(n) (step S106). That is, in the case where the absolute value of the relative speed V exceeds the maximum relative speed Vmax ("Y" in step S104), the accuracy of the process based on the distance image PZ may be low. Therefore, the reference position determination unit 26 may determine the search reference position POS on the basis of the position of the preceding vehicle 90 in the image P detected in the search process 124(n), not on the basis of the position of the preceding vehicle 90 in the distance image PZ detected in the preceding vehicle detection process 122(n).

This may be the end of this flow. The search processor 24 may perform the search process 124(n+1) on the subsequent frame F(n+1) on the basis of the search reference position POS that has been determined as described above.

In one embodiment, the stereo image PIC of the frame F(n−1) and the distance image PZ of the frame F(n−1) may respectively serve as a "first stereo image" and a "first distance image". In one embodiment, the stereo image PIC of the frame F(n) and the distance image PZ of the frame F(n) may respectively serve as a "second stereo image" and a "second distance image". In one embodiment, the stereo image PIC of the frame F(n+1) and the distance image PZ of the frame F(n+1) may respectively serve as a "third stereo image" and a "third distance image". In one embodiment, the maximum relative speed Vmax may serve as a "threshold speed". In one embodiment, the process defined in step S105 may serve as a "first prediction process". In one embodiment, the process defined in step S106 may serve as a "second prediction process".

In this way, the vehicle exterior environment detection apparatus 1 may detect the preceding vehicle 90 on the basis of the distance image PZ and may also detect the preceding vehicle 90 on the basis of the image P, and is therefore able to enhance the accuracy of detecting the preceding vehicle 90. That is, in a case where a part of either one of the left image PL and the right image PR becomes unclear due to raindrops, for example, the image accuracy of the distance image PZ can be decreased, and as a result, there is a possibility that the accuracy of detecting the preceding vehicle 90 on the basis of the distance image PZ can be low. However, the vehicle exterior environment detection apparatus 1 may detect the preceding vehicle 90 on the basis of the distance image PZ and may also detect the preceding vehicle 90 on the basis of the image P; therefore, even in the case where a part of either one of the left image PL and the right image PR is unclear as mentioned above, the vehicle exterior environment detection apparatus 1 is able to detect the preceding vehicle 90 on the basis of the image P which is the clearer one of the left image PL and the right image PR. Thus, it is possible to enhance the accuracy of detecting the preceding vehicle 90.

The vehicle exterior environment detection apparatus 1 may determine, as illustrated in FIG. 6, the search reference position POS indicating a reference position in the search process 124 on the basis of the vehicle image widths W1 and W2, to thereby predict the position of the preceding vehicle 90 in the left image PL and the right image PR. In this way, it is possible for the vehicle exterior environment detection apparatus 1 to enhance the accuracy of detecting the preceding vehicle 90.

That is, in a case where the reference position determination unit determines the search reference position POS on the basis of the position of the preceding vehicle 90 in the distance image PZ detected in the preceding vehicle detection process 122 every time, there is a possibility that the search reference position POS can deviate from a desired position in a case where a part of either one of the left image PL and the right image PR is unclear due to raindrops, for example, as described below.

Figure 7A:
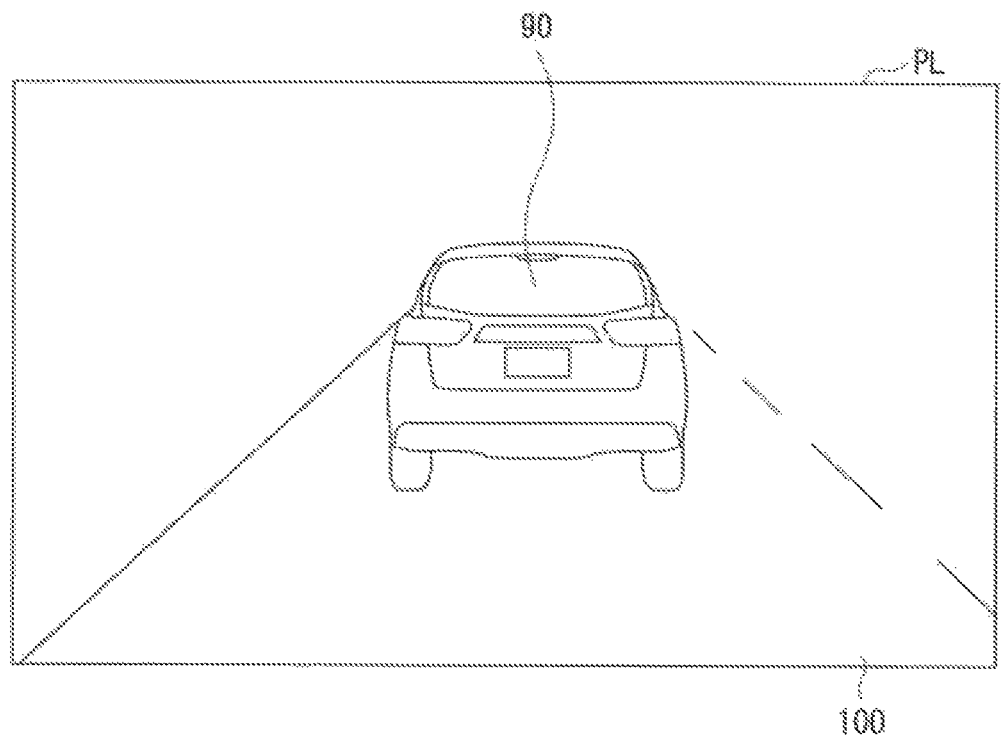
FIG. 7A is an image diagram illustrating another example of the left image generated by the left camera illustrated in FIG. 1.
Figure 7B:
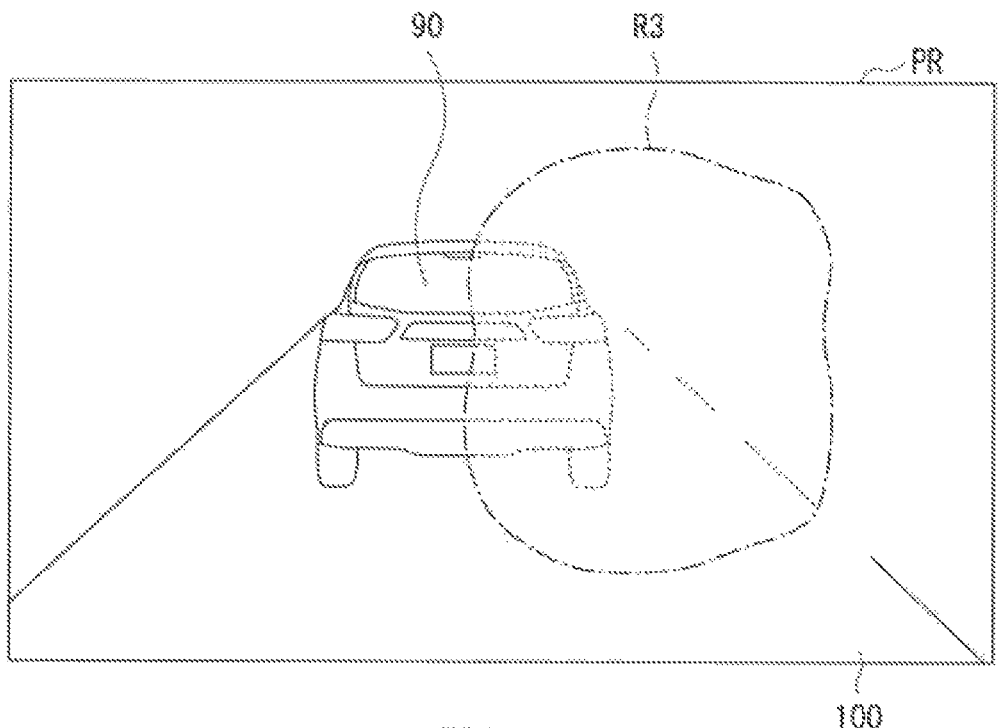
FIG. 7B is an image diagram illustrating another example of the right image generated by the right camera illustrated in FIG. 1.
Figure 8:
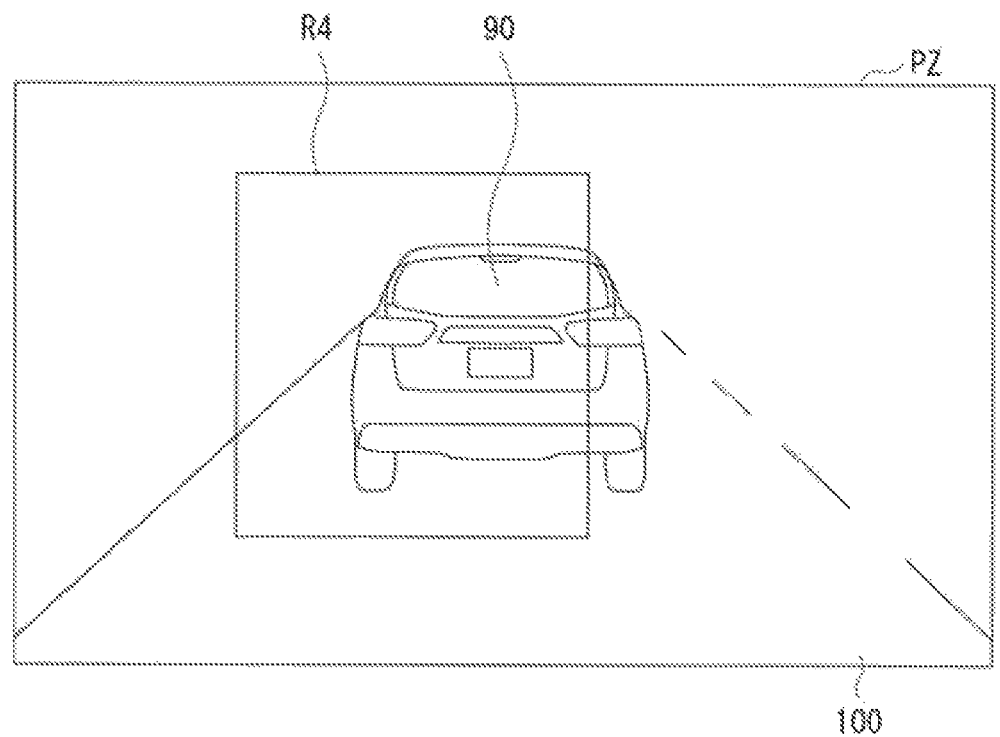
FIG. 8 is an image diagram schematically illustrating another operation example of the preceding vehicle detector illustrated in FIG. 1.

FIG. 7A illustrates an example of the left image PL, and FIG. 7B illustrates an example of the right image PR. FIG. 8 schematically illustrates an example of a detection result obtained by the preceding vehicle detector 22.

In this example, as illustrated in FIG. 7B, a part corresponding to a region R3 in the right image PR is unclear due to raindrops. The right half of the preceding vehicle 90 is unclear in the right image PR accordingly. The distance image generator 21 can attempt to generate the distance image PZ on the basis of the left image PL and the right image PR, and the preceding vehicle detector 22 can attempt to detect the preceding vehicle 90 on the basis of the distance image PZ. In this example, the right half of the preceding vehicle 90 is unclear in the right image PR; therefore, the distance image PZ can have an inaccurate depth value in an image region corresponding to the right half of the preceding vehicle 90. Alternatively, the distance image PZ can have a desired depth value in an image region corresponding to the left half of the preceding vehicle 90. As a result, in this example, there is a possibility that the preceding vehicle detector 22 can erroneously determine that the preceding vehicle 90 exists at a position, as a region R4 illustrated in FIG. 8, which is deviated to the left from an actual position of the preceding vehicle 90. Therefore, in a case where the reference position determination unit determines the search reference position POS on the basis of the detection result and the search processor 24 searches for the preceding vehicle 90 using the search reference position POS as a reference, there is a possibility that the search process can be unsuccessful.

In contrast, as illustrated in FIG. 6, the vehicle exterior environment detection apparatus 1 may determine, on the basis of the vehicle image widths W1 and W2: the search reference position POS on the basis of the position of the preceding vehicle 90 in the distance image PZ detected in the preceding vehicle detection process 122; or the search reference position POS on the basis of the position of the preceding vehicle 90 in the image P detected in the search process 124. In this way, for example, in a case where a part of the right image PR becomes unclear as illustrated in FIG. 7B, the distance image PZ can have a desired depth value in an image region corresponding to the left half of the preceding vehicle 90; therefore, for example, the vehicle image width W1 can have a value different from a desired width. In this manner, the difference between the vehicle image width W1 and the vehicle image width W2 can vary largely. In such a case, for example, the absolute value of the relative speed V may exceed the maximum relative speed Vmax ("Y" in step S104); therefore, the reference position determination unit 26 may determine the search reference position POS on the basis of the position of the preceding vehicle 90 in the image P. The image P is an image which is either one of the left image PL and the right image PR that has a higher certainty that the preceding vehicle 90 is a vehicle. In this example, the image P is not the right image PR having an unclear part, and is the left image PL, which is clear. Accordingly, the reference position determination unit 26 is able to determine the search reference position POS with high accuracy on the basis of the left image PL. Thereafter, the search processor 24 may search for the preceding vehicle 90 on the basis of the search reference position POS; therefore, it is possible to reduce the possibility that the search process is unsuccessful. As a result, the vehicle exterior environment detection apparatus 1 is able to enhance the accuracy of detecting the preceding vehicle 90.

In a case where both of the left image PL and the right image PR are clear, for example, the vehicle exterior environment detection apparatus 1 may determine the search reference position POS on the basis of the position of the preceding vehicle 90 in the distance image PZ. In this way, the vehicle exterior environment detection apparatus 1 may predict the position of the preceding vehicle 90 which is obtained with high accuracy using the distance image PZ based on the stereo image PIC. Therefore, the vehicle exterior environment detection apparatus 1 is able to enhance the accuracy of detecting the preceding vehicle 90.

In this manner, the vehicle exterior environment detection apparatus 1 may determine, on the basis of either one of the vehicle image widths W1 and W2, the search reference position POS on the basis of a result of the preceding vehicle detection process 122 and a result of the search process 124. Accordingly, the vehicle exterior environment detection apparatus 1 is able to determine the search reference position POS more accurately depending on the situation. Therefore, the vehicle exterior environment detection apparatus 1 is able to enhance the accuracy of detecting the preceding vehicle 90.

Example Effects

As described above, in the example embodiment, the position of the preceding vehicle in the left image and the right image is predicted on the basis of the vehicle image widths W1 and W2. Therefore, it is possible to determine appropriately the search reference position, even in a case where a part of either one of the left image and the right image is unclear, for example. Thus, it is possible to enhance the accuracy of detecting the preceding vehicle.

In the example embodiment, the position of the preceding vehicle in the left image and the right image is predicted by, on the basis of the vehicle image widths W1 and W2: determining the search reference position on the basis of the position of the preceding vehicle in the distance image PZ detected in the preceding vehicle detection process; or determining the search reference position on the basis of the position of the preceding vehicle in the image P detected in the search process. Therefore, in a case where a part of the right image PR is unclear, for example, it is possible to determine the search reference position on the basis of the position of the preceding vehicle in the image P detected in the search process. Thus, it is possible to enhance the accuracy of detecting the preceding vehicle.

In the example embodiment, the search reference position is determined on the basis of the vehicle image widths W1 and W2, and on the basis of either one of a result of the preceding vehicle detection process and a result of the search process. Therefore, it is possible to determine the search reference position more accurately depending on the situation. Thus, it is possible to enhance the accuracy of detecting the preceding vehicle.

Although some example embodiments of the technology have been described in the foregoing, the technology is by no means limited to the example embodiments. Various changes and modifications may be made to any embodiment without departing from the scope of the technology.

For example, an example embodiment has been described above in which, as illustrated in steps S102 to S104 of FIG. 6, the relative speed V is calculated on the basis of the vehicle image widths W1 and W2, whether the absolute value of the relative speed V exceeds the maximum relative speed Vmax is confirmed to thereby confirm whether the accuracy of the process based on the distance image PZ is low, and, on the basis of the confirmation result, the search reference position POS is determined. However, the technology is not limited thereto. Alternatively, for example, various techniques may be used that make it possible to confirm whether the accuracy of the process based on the distance image PZ is low on the basis of the vehicle image widths W1 and W2. For example, the reference position determination unit 26 may calculate a difference between the vehicle image width W1 and the vehicle image width W2, to thereby confirm, on the basis of the difference, whether the accuracy of the process based on the distance image PZ is low. In one example, the reference position determination unit 26 may determine that the accuracy of the process based on the distance image PZ is low in a case where the absolute value of the difference exceeds a predetermined threshold, for example, and may be able to determine the search reference position POS on the basis of the position of the preceding vehicle 90 in the image P detected in the search process 124.

For example, although an example embodiment has been described above in which the preceding vehicle 90 traveling ahead of the vehicle 10 is regarded as the target of a process, the technology is not limited thereto. Alternatively, for example, a vehicle traveling behind the vehicle 10 may be regarded as the target of the process. In this case, the stereo camera 11 may capture an image behind the vehicle 10.

The example effects described above are merely illustrative and non-limiting. Any embodiment may achieve an effect other than the example effects described above.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM.

The ASIC is an integrated circuit (IC) customized to perform, and the FPGA is an integrated circuit designed to be configured after manufacturing in order to perform, all or a part of the functions of the processor 20 illustrated in FIG. 1.

The invention claimed is:

1. A vehicle exterior environment detection apparatus comprising:
    a distance image generator configured to generate a plurality of distance images on a basis of a plurality of stereo images, the plurality of distance images including a first distance image, a second distance image, and a third distance image, the plurality of stereo images including a first stereo image, a second stereo image, and a third stereo image, the first stereo image, the second stereo image, and the third stereo image being captured at timings different from each other and each including a left image and a right image;
    a vehicle detector configured to perform a detection of a target vehicle on a basis of each of the plurality of distance images;
    a search processor configured to perform searching of the target vehicle on a basis of the left image and the right image included in each of the plurality of stereo images, and select, as a selected image, one of the left image and the right image on a basis of a result of the searching;
    a vehicle width calculator configured to calculate, as a first vehicle image width, an image width of the target vehicle in each of the plurality of distance images, and calculate, as a second vehicle image width, an image width of the target vehicle in the selected image of each of the plurality of stereo images; and
    a predictor configured to predict a position of the target vehicle in the left image and the right image included in the third stereo image, on a basis of the first vehicle image width calculated on a basis of the first distance image and the second vehicle image width calculated on a basis of the selected image of the second stereo image.

2. The vehicle exterior environment detection apparatus according to claim 1, wherein the search processor performs, on a basis of the left image and the right image included in the third stereo image, the searching of the target vehicle on a basis of a position predicted by the predictor as a reference.

3. The vehicle exterior environment detection apparatus according to claim 2, wherein the search processor is configured to select, as the selected image, one of the left image and the right image by evaluating a certainty that the target vehicle is a vehicle, on a basis of an image corresponding to the target vehicle that has been searched for in the left image and an image corresponding to the target vehicle that has been searched for in the right image.

4. The vehicle exterior environment detection apparatus according to claim 2, wherein
    the predictor is configured to perform selectively one of a first prediction process and a second prediction process on the basis of the first vehicle image width calculated on the basis of the first distance image and the second vehicle image width calculated on the basis of the selected image of the second stereo image,
    the first prediction process includes a process that predicts the position of the target vehicle on a basis of a result of the detection performed by the vehicle detector, the result of the detection being based on the second distance image, and the second prediction process includes a process that predicts the position of the target vehicle on a basis of the result of the searching performed by the search processor, the result of the searching being based on the selected image of the second stereo image.

5. The vehicle exterior environment detection apparatus according to claim 4, wherein the search processor is configured to select, as the selected image, one of the left image and the right image by evaluating a certainty that the target vehicle is a vehicle, on a basis of an image corresponding to the target vehicle that has been searched for in the left image and an image corresponding to the target vehicle that has been searched for in the right image.

6. The vehicle exterior environment detection apparatus according to claim 4, wherein the predictor is configured to
calculate a relative speed between a traveling speed of an own vehicle on which the vehicle exterior environment detection apparatus is mounted and a traveling speed of the target vehicle, on the basis of the first vehicle image width calculated on the basis of the first distance image and the second vehicle image width calculated on the basis of the selected image of the second stereo image, and
perform selectively one of the first prediction process and the second prediction process on a basis of the relative speed.

7. The vehicle exterior environment detection apparatus according to claim 6, wherein the predictor is configured to
calculate a threshold speed on a basis of the second vehicle image width calculated on the basis of the selected image of the second stereo image,
perform a comparison of the relative speed with the threshold speed, and
perform selectively one of the first prediction process and the second prediction process on a basis of a result of the comparison.

8. The vehicle exterior environment detection apparatus according to claim 7, wherein the predictor performs the second prediction process in a case where an absolute value of the relative speed is higher than the threshold speed.

9. The vehicle exterior environment detection apparatus according to claim 7, wherein the predictor performs the first prediction process in a case where an absolute value of the relative speed is lower than the threshold speed.

10. The vehicle exterior environment detection apparatus according to claim 9, wherein the predictor performs the second prediction process in a case where the absolute value of the relative speed is higher than the threshold speed.

11. The vehicle exterior environment detection apparatus according to claim 1, wherein
the predictor is configured to perform selectively one of a first prediction process and a second prediction process on the basis of the first vehicle image width calculated on the basis of the first distance image and the second vehicle image width calculated on the basis of the selected image of the second stereo image,
the first prediction process includes a process that predicts the position of the target vehicle on a basis of a result of the detection performed by the vehicle detector, the result of the detection being based on the second distance image, and
the second prediction process includes a process that predicts the position of the target vehicle on a basis of the result of the searching performed by the search processor, the result of the searching being based on the selected image of the second stereo image.

12. The vehicle exterior environment detection apparatus according to claim 11, wherein the search processor is configured to select, as the selected image, one of the left image and the right image by evaluating a certainty that the target vehicle is a vehicle, on a basis of an image corresponding to the target vehicle that has been searched for in the left image and an image corresponding to the target vehicle that has been searched for in the right image.

13. The vehicle exterior environment detection apparatus according to claim 11, wherein the predictor is configured to
calculate a relative speed between a traveling speed of an own vehicle on which the vehicle exterior environment detection apparatus is mounted and a traveling speed of the target vehicle, on the basis of the first vehicle image width calculated on the basis of the first distance image and the second vehicle image width calculated on the basis of the selected image of the second stereo image, and
perform selectively one of the first prediction process and the second prediction process on a basis of the relative speed.

14. The vehicle exterior environment detection apparatus according to claim 13, wherein the predictor is configured to
calculate a threshold speed on a basis of the second vehicle image width calculated on the basis of the selected image of the second stereo image,
perform a comparison of the relative speed with the threshold speed, and
perform selectively one of the first prediction process and the second prediction process on a basis of a result of the comparison.

15. The vehicle exterior environment detection apparatus according to claim 14, wherein the predictor performs the second prediction process in a case where an absolute value of the relative speed is higher than the threshold speed.

16. The vehicle exterior environment detection apparatus according to claim 14, wherein the predictor performs the first prediction process in a case where an absolute value of the relative speed is lower than the threshold speed.

17. The vehicle exterior environment detection apparatus according to claim 16, wherein the predictor performs the second prediction process in a case where the absolute value of the relative speed is higher than the threshold speed.

18. The vehicle exterior environment detection apparatus according to claim 1, wherein the search processor is configured to select, as the selected image, one of the left image and the right image by evaluating a certainty that the target vehicle is a vehicle, on a basis of an image corresponding to the target vehicle that has been searched for in the left image and an image corresponding to the target vehicle that has been searched for in the right image.

19. A vehicle exterior environment detection apparatus comprising
circuitry configured to
generate a plurality of distance images on a basis of a plurality of stereo images, the plurality of distance images including a first distance image, a second distance image, and a third distance image, the plurality of stereo images including a first stereo image, a second stereo image, and a third stereo image, the first stereo image, the second stereo image, and the third stereo image being captured at timings different from each other and each including a left image and a right image,
perform a detection of a target vehicle on a basis of each of the plurality of distance images, perform searching of the target vehicle on a basis of the left image and the right image included in each of the plurality of stereo images, and select, as a selected image, one of the left image and the right image on a basis of a result of the searching, calculate, as a first vehicle image width, an image width of the target vehicle in each of the plurality of distance images, and calculate, as a second vehicle image width, an image width of the target vehicle in the selected image of each of the plurality of stereo images, and predict a position of the target vehicle in the left image and the right image included in the third stereo image, on a basis of the first vehicle image width calculated on a basis of the first distance image and the second vehicle image width calculated on a basis of the selected image of the second stereo image.

* * * * *